US010051998B2

(12) United States Patent
Boozer et al.

(10) Patent No.: US 10,051,998 B2
(45) Date of Patent: Aug. 21, 2018

(54) BLENDING CONTAINER

(71) Applicant: Vita-Mix Corporation, Olmsted Township, OH (US)

(72) Inventors: Richard D. Boozer, Wakeman, OH (US); Timothy J. Greszler, Oberlin, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 61 days.

(21) Appl. No.: 14/658,906

(22) Filed: Mar. 16, 2015

(65) Prior Publication Data

US 2015/0258514 A1    Sep. 17, 2015

Related U.S. Application Data

(60) Provisional application No. 61/952,925, filed on Mar. 14, 2014.

(51) Int. Cl.
*A47J 43/00* (2006.01)
*A47J 43/07* (2006.01)

(52) U.S. Cl.
CPC .................. *A47J 43/0727* (2013.01)

(58) Field of Classification Search
CPC . A47J 43/0727; A47J 43/085; A47J 43/02727
USPC ........................................................ 266/665
See application file for complete search history.

(56) References Cited

U.S. PATENT DOCUMENTS

| 3,355,045 A | * | 11/1967 | Douglas | A47J 41/0016 215/12.1 |
|---|---|---|---|---|
| 3,417,972 A | | 12/1968 | Vincent | |
| 5,589,119 A | | 12/1996 | Hetherington | |
| 2006/0176765 A1 | * | 8/2006 | Pryor, Jr. | A47J 43/046 366/192 |
| 2011/0046786 A1 | | 2/2011 | Wulf et al. | |
| 2012/0206995 A1 | * | 8/2012 | Wu | A47J 43/0777 366/205 |
| 2013/0153572 A1 | | 1/2013 | Gillette et al. | |

FOREIGN PATENT DOCUMENTS

WO    2007061967 A2    5/2007

OTHER PUBLICATIONS

Young, Lee, International Search Report and Written Opinion, PCT/US2015/020769, dated Jun. 17, 2015, ISA/US, Alexandria, Virginia.

* cited by examiner

*Primary Examiner* — Anshu Bhatia
(74) *Attorney, Agent, or Firm* — McDonald Hopkins LLC

(57) ABSTRACT

A container of a blending system is shown and described. The container may include a carrier formed from a first material, the carrier configured to engage a base of the blending system. The container may also include a liner positioned in the carrier a distance apart from the carrier, wherein the carrier generally circumscribes the liner, where the liner is formed from a second material different from the first material.

24 Claims, 11 Drawing Sheets

BLENDING CONTAINER

CROSS-REFERENCE TO RELATED APPLICATION

This application claims the benefit of U.S. Provisional Patent Application Ser. No. 61/952,925, filed Mar. 14, 2014, and entitled "BLENDING CONTAINER," the entirety of which is incorporated herein by reference.

TECHNICAL FIELD

The present disclosure relates to a blending container and more particularly, to a blending container having a multiple walled construction.

BACKGROUND

Blending devices for home and commercial applications are often used to blend and process foodstuffs. Blending devices typically include a motor that drives a blade assembly to rotate the blade at high speeds. The blade assembly is generally disposed within a container when the blade is rotating. The blending device may chop, mix, blend, or otherwise prepare foodstuff. Blending devices may produce large amounts of noise during operation. In traditional blending devices, the noise may result from operation of the motor, rotation of the blades, and blending of foodstuffs. Some of the noise may escape a container of a blending device. The noise may be irritating or even harmful to users.

While many blending systems have a container or jar for blending foods, they may not insulate the user from hot or cold food substances. Single-wall blenders formed of suitable materials, such as glass, metals, and plastics, transmit heat and make blending hot or cold products difficult and unpleasant for a consumer to handle. The consumer is exposed to heated blender container walls, or in the case of cold foodstuff, the consumer is exposed to cold and potentially slippery blender container walls.

Although glass containers have been developed for use with blending systems, glass containers are cumbersome because they are large, heavy, and breakable. Glass containers are difficult for some consumers to handle as they are heavy. Additionally, glass containers are prone to external breakage when contacting other dense materials, such as sinks or countertops, and internal breakage when contacting hard foreign objects, such as steel kitchen utensils that come in contact with the glass.

Furthermore, glass can break into small pieces when contacted with these dense materials. Some blender designs attempt to solve the breakage issue by adding a weak link in the blending system, however this often breaks when exposed to a large force (such as a drive shaft coupling).

Also, there exists a difficulty in molding glass structures, i.e., glass containers that are ergonomic and have graduations, such as graduated openings and graduated pedestals.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A container of a blending system is shown and described. The container may include a carrier formed from a first material, the carrier configured to engage a base of the blending system. The container may also include a liner positioned in the carrier a distance apart from the carrier, wherein the carrier generally circumscribes the liner, where the liner is formed from a second material different from the first material.

A container configured to selectively engage a base of a blending system may include a carrier formed of plastic, and a handle extending from the carrier and formed from the plastic; the handle including a gripping portion attached thereto, where the gripping portion is formed from an elastomeric material. The container may also include a liner positioned in the carrier a distance from the carrier, the liner formed from glass, where the carrier generally circumscribes the liner, and a seal connected to the carrier, the seal sealingly engaged with the liner.

A container configured to selectively engage a base of a blending system may include a carrier formed of plastic, and a liner positioned in the carrier a distance from the carrier, the liner formed from glass, wherein the carrier generally circumscribes the liner. The container may also include a pedestal monolithically formed with the carrier and formed from the plastic, the pedestal configured to operatively engage the base.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout.

DETAILED DESCRIPTION

Figure 1:
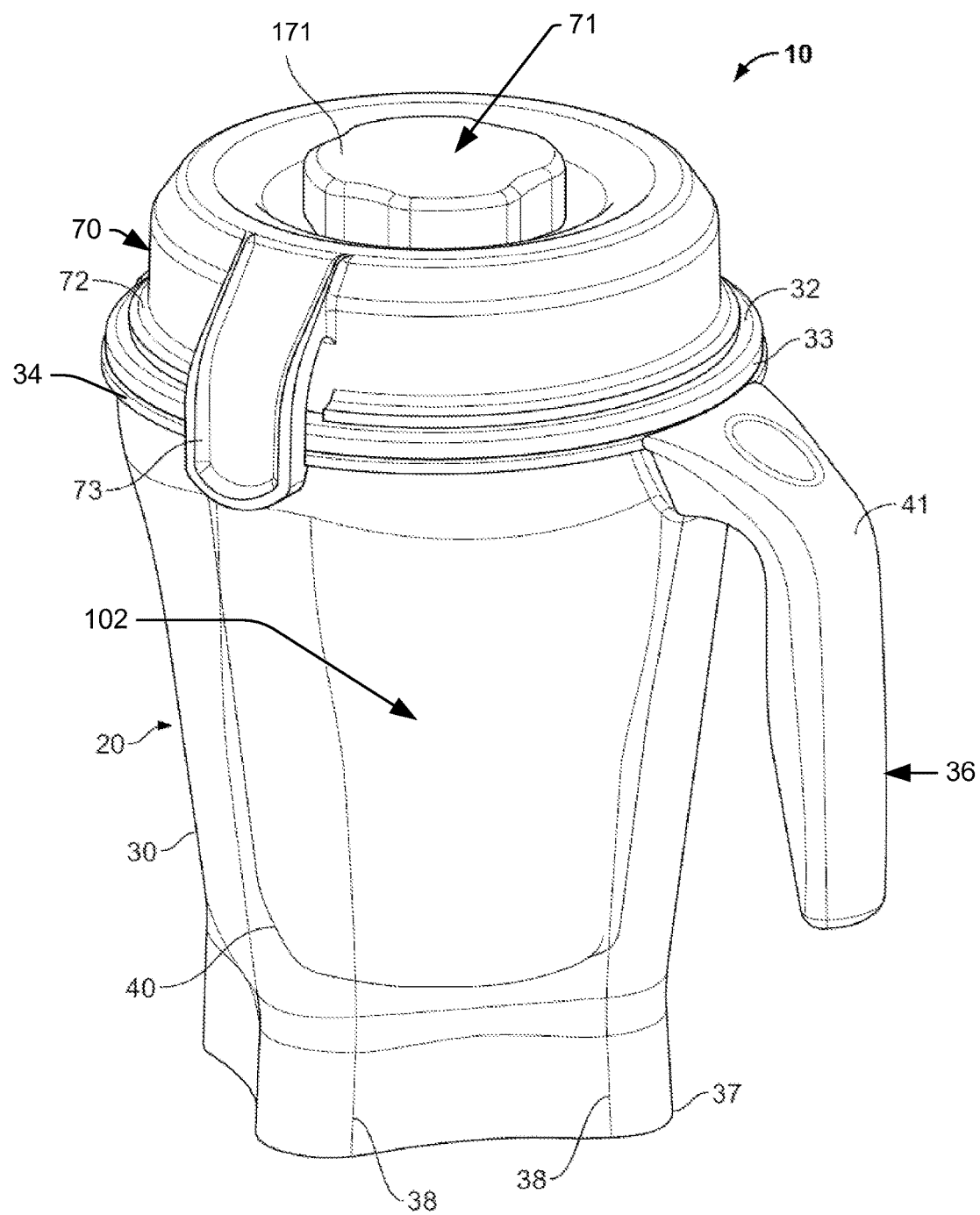
FIG. 1 is a front and left perspective side view of a blending container with a carrier, in accordance with various disclosed aspects.

Reference will now be made in detail to exemplary embodiments, examples of which are illustrated in the accompanying drawings, wherein like numbered aspects refer to a common feature throughout. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, spice grinder systems, coffee grinder systems, mixing systems, hand-held blending systems, various other food preparation systems, and the likes. As such, references to a blender, blender system, and the likes, are understood to include food processor systems, and other mixing systems. Such systems generally include a blender base that may include a motor, a blade assembly, and a controller. Further, such systems may include a container, a display, a memory or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blending container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the likes.

It is noted that the blending systems may include any household blender and/or any type of commercial blending system, including those with covers that may encapsulate or partially encapsulate the blender. Commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the likes. It is noted that various other blended products may result from blending ingredients. Accordingly, terms such as "blended product" or "drink" may be used interchangeably unless context suggests otherwise or warrants a particular distinction among such terms. Further, such terms are not intended to limit possible blended products and should be viewed as examples of possible blended products.

Figure 2:
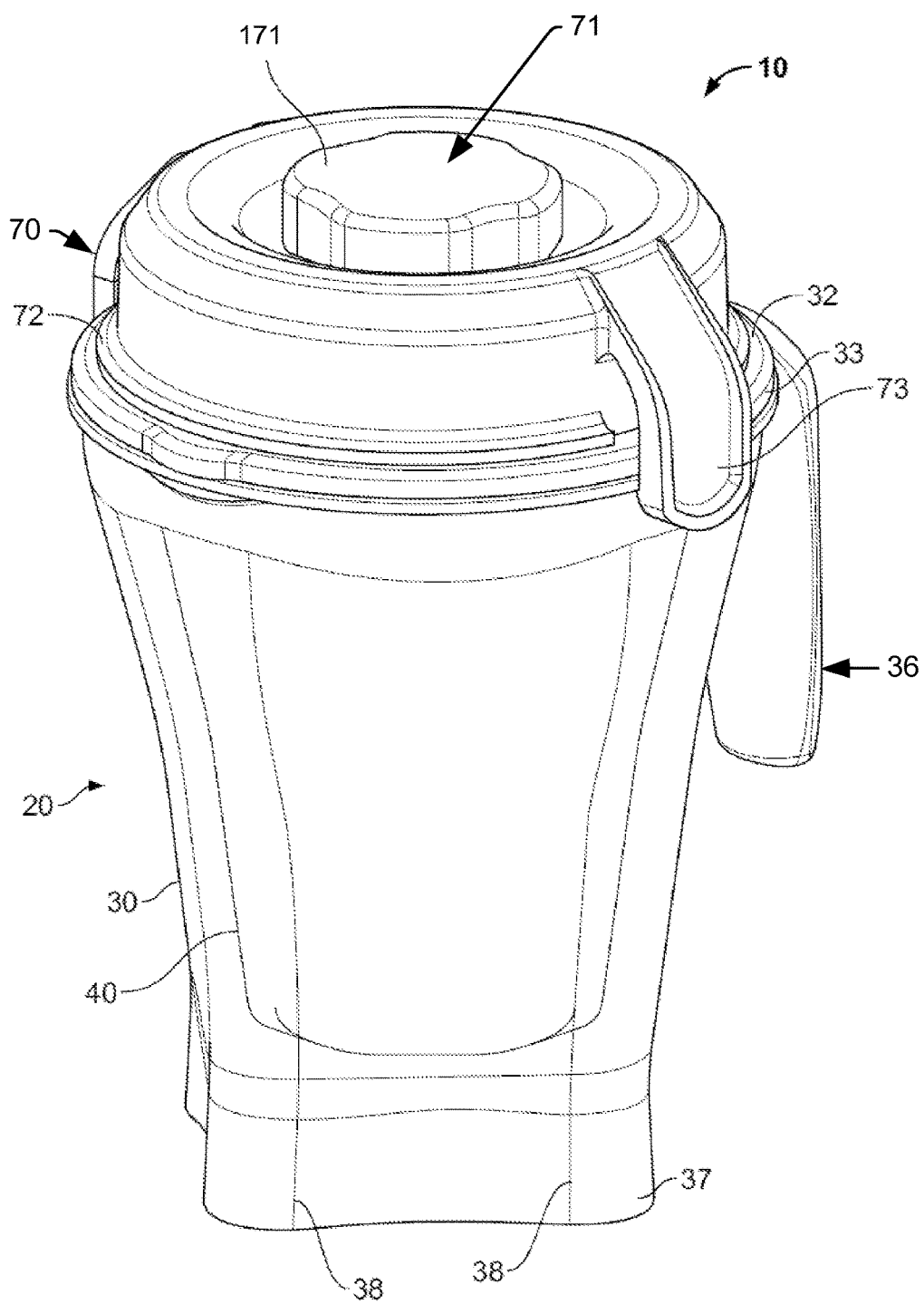
FIG. 2 is a back and left perspective side view of the blending container with a carrier, in accordance with various disclosed aspects.

Portions of a blending system 10 are generally provided in FIGS. 1-11. FIG. 1 is a front and left perspective view of blending system 10 in accordance with various described embodiments. Likewise, FIG. 2 is a back and left perspective side view of blending system 10. The components of the blending system 10 may be of any appropriate configuration and type. The present teachings are not limited to the blending system 10 described herein. For instance, a blending container 20 may comprise various shapes and dimensions. Likewise, blending system 10 may include different components not shown for readability, such as a blender base, a tamper or agitator, a blade assembly, and the likes. In at least one example, the blending system 10 may be of any blending system or blender sold by Vita-Mix Corporation.

The blending system 10 includes a blending container 20. The blending container 20 may be any appropriate size and shape, such as generally cylindrical, square, conical, a combination thereof, etc. Furthermore, the blending container 20 may be of any appropriate size and may have any appropriate capacity. For instance a cavity of blending container 20 may have a volumetric capacity of any desired size, such as 64 oz., 48 oz., 32 oz. and the like. In another aspect, the blending container 20 may have various components, such as notches and indicia that indicate measurements to assist with the production of food products. For example, indicia may indicate a quantity of foodstuffs in a container (e.g., ounces, cups, etc.).

The blending container 20 may include a double-wall construction comprised of a carrier 30 formed of a first material and a liner 40 formed of a second material, whereby the first and second material may comprise the same or different material. The double-wall construction of the blending container 20 creates a thermal effect, helping keep cold foodstuff cold and hot foodstuff hot for extended periods of time. In addition, the double-wall construction generally protects a user from the heat or cold because it is generally heat resistant and prevents condensation, therefore affording additional comfort to a user handling the blending container 20. Scratching and cloudiness in the blending container 20 may be lessened, with respect to other blending containers, because the external wall, such as a carrier 30, is not in direct contact with a blending blade or foodstuffs being blended. A double-wall construction additionally provides resistance to temperature swings that may otherwise occur.

Carrier 30 may generally comprise an outer layer of the blending container 20. The carrier 30 may be made of any suitable material, such as plastic materials, including but not limited to, polymer material, polycarbonate or BPA (bisphenol-a) free plastics, food grade plastics, etc. In at least one aspect, the carrier 30 being formed from a plastic material may reduce the overall weight of the blending container 20—especially as compared to full glass blending containers—while maintaining its functionality and usefulness. Further, as the plastic carrier 30 is not exposed to contents being blended in the blending container 20, the plastic carrier 30 may have a reduced chance of being scratched from a blending process. For example, some full plastic blending containers may be altered by foodstuffs during blending. Hard or sharp objects in the foodstuff may collide with the blending container at high speeds. This may result in scratches if an internal cavity is defined by a plastic surface. However, carrier 30 may not be scratched as it is generally removed or protected from such collisions.

The carrier 30 may be any appropriate size and shape, such as generally cylindrical, rectangular, a combination thereof, etc. Carrier 30 may be formed of a material that is clear, transparent, or opaque. In another aspect, carrier 30 may be formed of a clear material, an at least partially transparent material, an opaque material, a colored material (e.g., partially transparent material having a color, non-transparent material having color, etc.), or the likes.

Moreover, carrier 30 may include a pedestal 37 at or near a bottom of container 20. The pedestal 37 may be sized and shaped to operatively engage a base of a blending system. The pedestal 37 may further include one or more components (not shown), such as a sensor and a locking mechanism, to provide a safety lock. The pedestal 37 may be formed from plastic substantially similar to the carrier 30. In at least one embodiment, the pedestal 37 may be monolithically formed with the carrier 30 or attached through a subsequent operation. In an aspect, pedestal 37 comprising plastic material may reduce the weight of the system 10 in comparison to a pedestal comprising glass. However, it is noted that pedestal 37 may be monolithically formed with liner 40. For instance, pedestal 37 may comprise a glass material substantially similar to a material of liner 40.

In embodiments, carrier 30 may include indicia or surface formations 38. Surface formations 38 may include inward or outward facing protrusions such as measuring lines, hand grips, stability indentations, and vents. In an aspect, plastic material may allow for reduced cost and difficulty in forming surface formations 38 in comparison to glass containers. The surface formations 38 may be monolithically formed with the carrier 30, such as through an injection molding process.

Moreover, surface formations 38 may include marks formed via an etching process, such as via chemical etching, laser etching, mechanical etching or the likes. In at least one embodiment, surface formations 38 may be disposed on or at an inner surface of carrier 30, such as a surface adjacent to liner 40.

Liner 40 may comprise an inner layer of the blending container 20 and may include a desired material, such as plastic, metal, glass, and the likes. In at least one embodiment, the liner 40 may comprise any suitable glass materials, such as a thermal shock-resistant glass. An inner surface of the liner 40, as described in more detail below and a lip 33 of liner 40 may generally define cavity 102.

In an embodiment, the liner 40 may be any appropriate size and shape, such as generally cylindrical, generally conical, generally an n-sided prism (where n is a number), irregular in shape, etc. In at least one embodiment, the liner 40 may comprise a similar shape to an internal surface of carrier 30. For instance, carrier 30 may encompass or partially surround liner 40, such that a shape of liner 40 may be at least partially dependent on the shape of carrier 30. It is noted that liner 40 may include shapes or elements not reflected in the shape or design of carrier 30. In embodiments, liner 40 may include one or more flutes, flats, rounded or concave corners, or the likes, as described in more detail herein.

While carrier 30 and liner 40 may be respectively referred to as an outer layer and an inner layer, it is noted that blending system 10 may comprise other layers. For instance, blending system 10 may comprise one or more layers disposed between carrier 30 and liner 40, one or more layers disposed between liner 40 and cavity 102, and/or one or more layers disposed between carrier 30 and an external environment. The one or more layers may comprise, without limitation, a non-stick coating, a layer of molded material, plastic, glass, wood, foam, or the likes. Furthermore, it is noted that such layers may be attachable (e.g., irremovably or removably), monolithically formed, or the likes. In at least one embodiment, blending container 20 may include a first wall, a second wall, and a third wall. The walls may comprise one or more materials.

Blending system 10 may include a lid 70 selectively attachable thereto. Lid 70 may couple or attach to an open end of container 20. In an aspect, lid 70 may comprise a boundary for cavity 102 such that foodstuff is contained during a blending process. In another aspect, lid 70 may allow for controlling thermal energy (e.g., heat, cold, etc.), pressure, and the likes, in container 20.

In embodiments, lid 70 may optionally include a capped opening 71 that may provide access to cavity 120 when lid 70 is attached to blending container 20. For instance, a user may pour foodstuff into a blender while the lid is attached or utilize a tamper during operation of the blending system 10. Lid 70 may include a sealing mechanism 72 that may create a seal when the lid 70 is attached to the blending container 20. In an aspect, the capped opening 71 may include a cap 171 that may cover the capped opening 71 and/or may be removed from capped opening 71.

In at least one embodiment, lid 70 may include a locking or latching device 73. As depicted, latching device 73 may include at least one U-shaped latch that creates a generally flushed seal with the blending container 20, and connects along an exterior side of the top opening 34 of the carrier 30. In an aspect, the latching device 73 may secure the lid 70 on container 20. While a latch is described, it is noted that latching device 73 may include various other configurations, as described in more detail below. For example, latching device 73 may include a threaded member, a magnetic member, a channel locking member, or the likes. In another aspect, lid 70 may include various different latching devices and various numbers of latching devices.

Latching device 73 may be monolithically formed with lid 70 or may be attached (e.g., removably or irremovably) to lid 70 through a subsequent operation. The latching device 73 may be positioned on the lid 70 in a fixed position to allow for the bottom of latching device 73 to operatively engage an underside of the over-mold seal 33. The latching device 73 may be a substantially hook-shaped latch to selectively attach the lid 70 with the blending container 20. In an aspect, the latching device 73 may prevent the lid 70 from separating from the blending container 20, maintain a seal, and/or may reduce vibration of the lid 70 during operation of the blending system 10.

It is noted that latching device 73 may be monolithically formed with container 20 or may be attached (e.g., removably or irremovably) to container 20 through a subsequent operation. It is further noted that latching component 73 be removable and/or a separate component from container 20 and/or lid 70. For instance, latching device 73 may be a clamp or clasp that may grasp a portion of container 20 and lid 70 to form a seal. In another example, latching device 73 may be monolithically formed with handle 36 or may be attached (e.g., removably or irremovably) to handle 36 through a subsequent operation.

Figure 3:
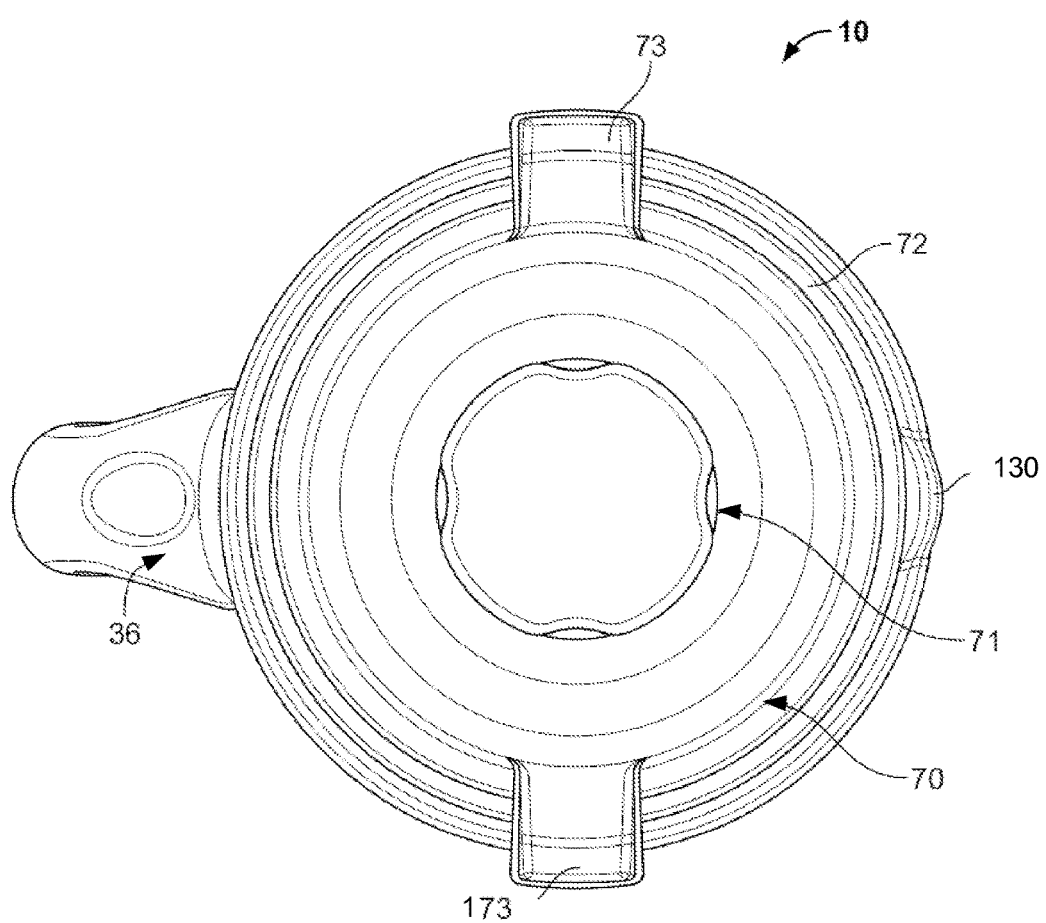
FIG. 3 is a top plane view of the blending container with a carrier, in accordance with various disclosed aspects.

Turning to FIG. 3, there is a top plane view of blending system 10. In an embodiment, blending container 20 may include a spout portion 130, as described in more detail with reference to FIG. 8. In another aspect, latch device 73 may include a first latch member 73 and a second latch member 173. It is noted that spout portion 130 may comprise a portion of carrier 30 and/or a portion of liner 40. For instance, carrier 30 may include a spout portion (e.g., carrier spout portion 39) that forms a spout when the liner 40 is attached with carrier 30. In an aspect, spout portion 130 may allow for controlled pouring of liquids and/or may reduce spillage.

Figure 4:
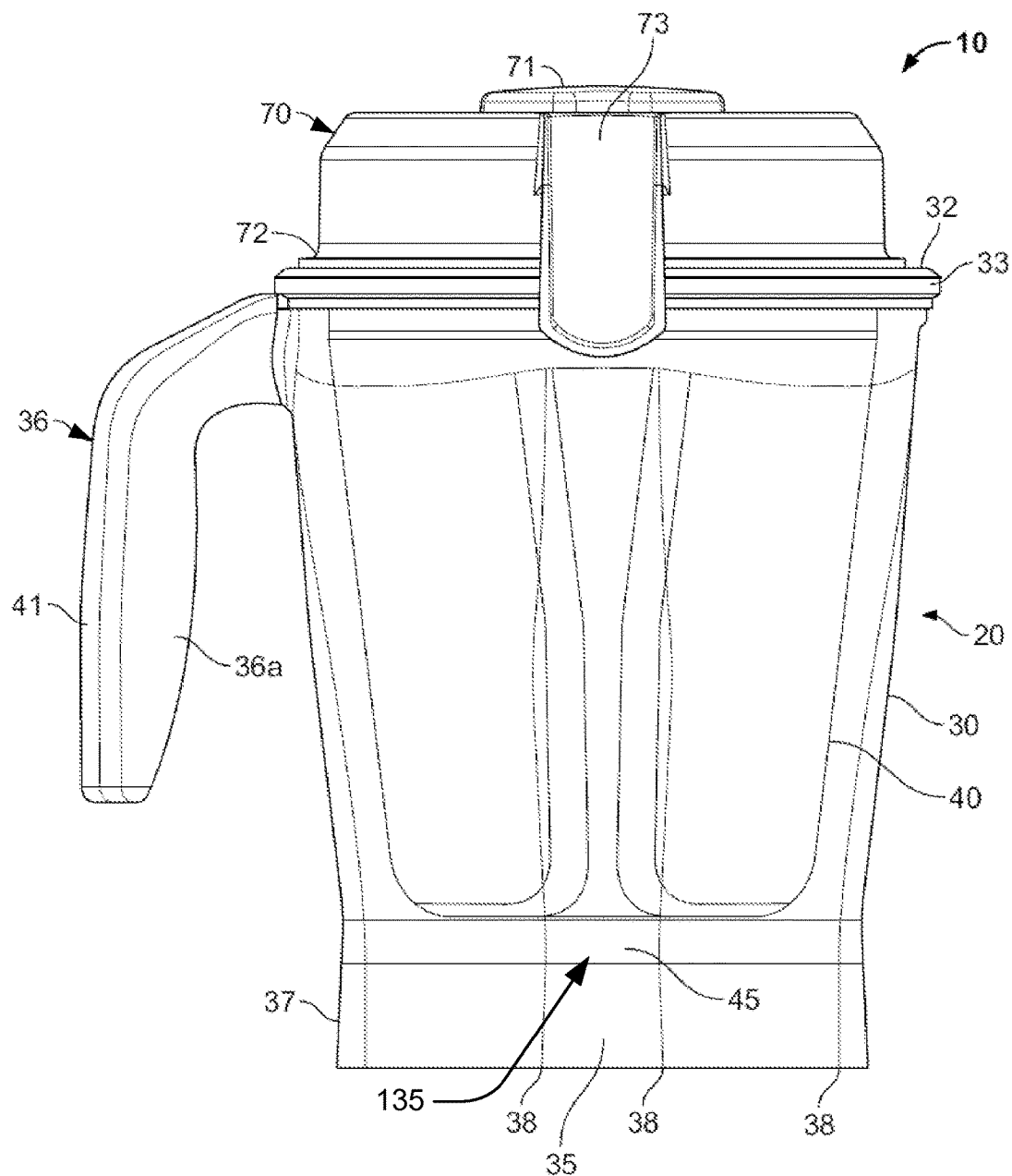
FIG. 4 is a right side view of the blending container with a carrier with a lid, in accordance with various disclosed aspects.

FIG. 4 is a right side view of blending system 10 illustrating that liner 40 may include a coupling element 45.

In an embodiment, the coupling element 45 may include an aperture 135 formed within at least one of the carrier 30 or liner 40. The aperture may allow for insertion and operative coupling with various components of a blending system, such as at least one of a blade assembly, drive shaft, base, or motor. As such, coupling element 45 may be an aperture of any suitable shape and/or configuration. For instance, the aperture may be a shape such as generally circular, generally rectangular, generally a j-sided polygon (where j is a number), an irregular shape, or the likes. It is noted that bottom coupling element 45 may include splines, steps, threads, chamber locks, or the likes. It is further noted that in at least one embodiment, the coupling element 45 may itself include a blade assembly or mixer suitable for connection with a drive shaft, base, motor, and the like.

Figure 6:
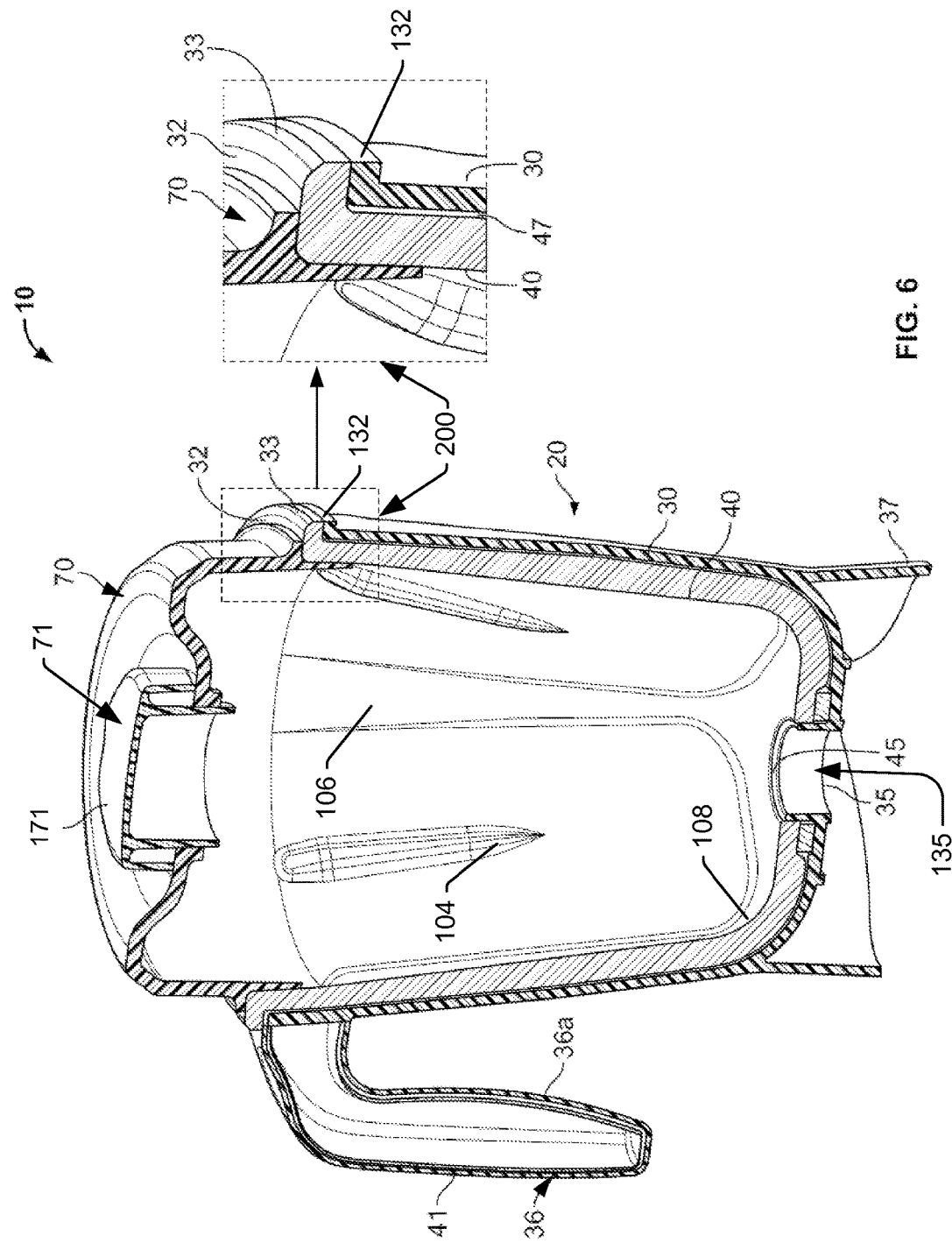
FIG. 6 is a cross-sectional view of a blending container with a carrier, in accordance with various disclosed aspects.

Coupling element 45 may include a washer, gasket, an O-ring, or the likes. In an aspect, a washer may include various materials, such as plastics, rubbers, metals, and the likes. In an example, coupling element 45 may include a die-cut washer seal as shown in FIG. 6. In an embodiment, the coupling element 45 may be formed with the carrier 30 and inserted into the liner 40, may be formed with the liner 40 and operatively engaged with the carrier 30, and/or may be a separate component that is engaged with at least one of the carrier 30 or liner 40.

Referring now to FIG. 6 with reference to FIG. 4, illustrated is a partial cross-sectional view of blending system 10 illustrating a bottom coupling element 35. In an aspect, carrier 30 may include bottom coupling element 35 disposed at an external surface of the carrier 30. The bottom coupling element 35 may be adapted to allow for insertion and operative coupling with various blending components, for example, a blade assembly, drive shaft, base, motor or a combination of such. For instance, the bottom coupling element 35 may include a protrusion extending inwardly, outwardly, or a combination of both. In at least one embodiment, bottom coupling element 35 may include an aperture 135 of any suitable shape and/or configuration. For instance, the aperture may be a shape such as generally circular, generally rectangular, generally a k-sided polygon (where k is a number), an irregular shape, or the likes. For example, bottom coupling element 35 may include an attachment member or means, such as a threaded portion (e.g., male or female), a latch, a channel lock, or the likes. The attachment member may be configured to receive or couple with a separate component. For instance, a blade assembly and/or retaining nut may be attached to the bottom coupling element 35.

In at least one embodiment, the bottom coupling element 35 may include a blade assembly, a drive assembly, retainer nut, or a mixer suitable for connection with any combination of a drive shaft, base, or a motor. For example, the bottom coupling element 35 may be removably or irremovably attached to a blade assembly, a drive assembly, retainer nut, or a mixer.

It is noted that the bottom coupling element 35 may be formed of metal, plastic, rubber, and the likes. In at least one embodiment, bottom coupling element 35 may be formed of a substantially similar material as the carrier 30, e.g., the bottom coupling element 35 may be plastic, including, without limitation, a polymer material, polycarbonate, BPA (bisphenol-a) free plastic, food grade plastic, or the likes. It is further noted that the bottom coupling element 35 may be monolithically formed with the carrier 30 and/or may be of separate construction.

Figure 5:
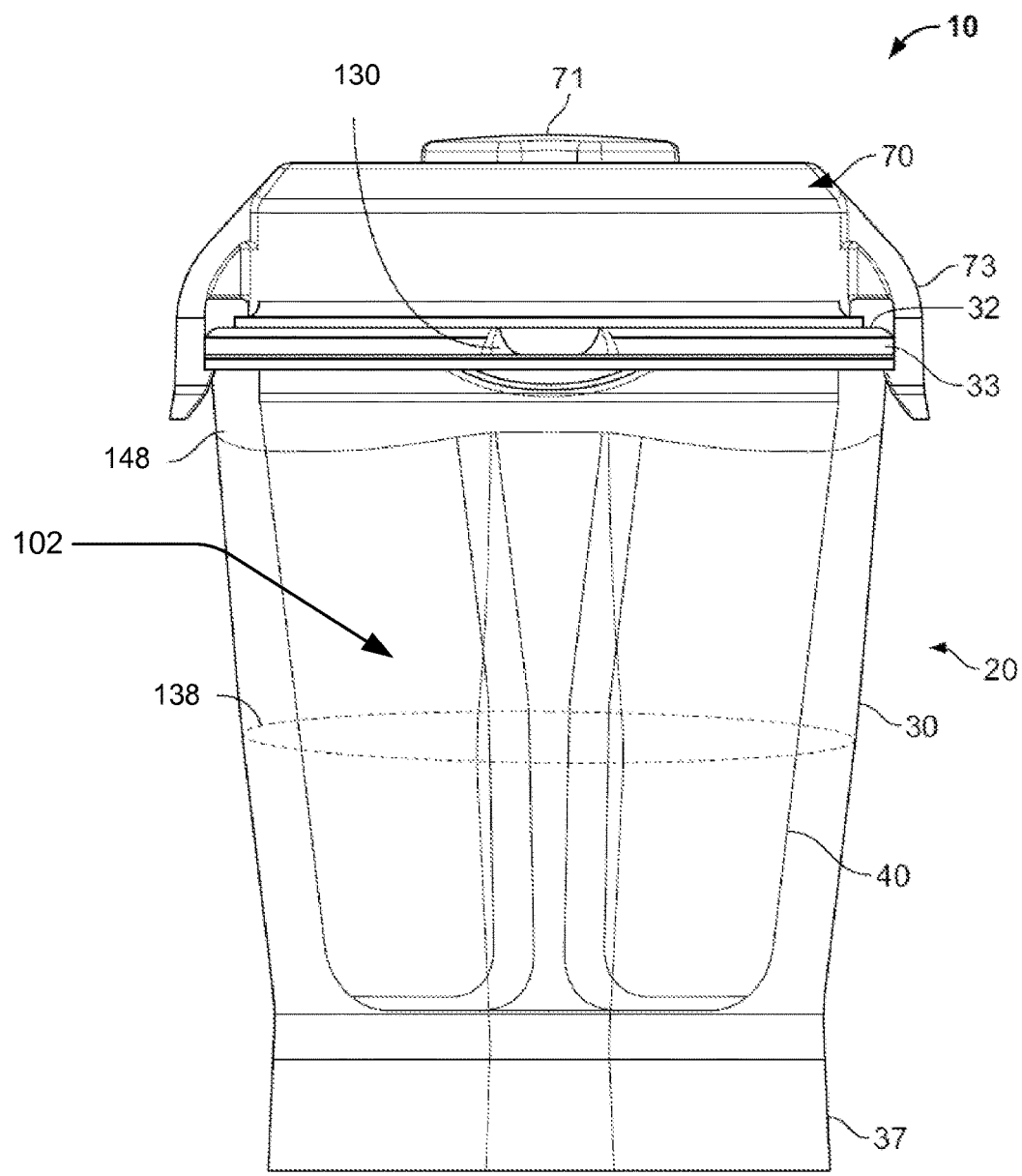
FIG. 5 is a back view of the blending container with a carrier, in accordance with various disclosed aspects.

Turning now to FIG. 5, illustrated is a back view of blending system 10. As noted above, carrier 30 may include indicia or surface formations (e.g., crowned surfaces, etchings, etc.). For instance, a surface formation may include inward or outward facing protrusions, indentations, etchings, or the likes. In an aspect, surface formations may convey information and/or allow for increased functionality of blending system 10. In an example, a surface formation may include measuring indicia (e.g., gradient markings, lines, symbols, text, etc.), hand grips, stability indentations, vents, textual marks, symbols, and the likes. As depicted, carrier 30 may include surface formations 138 and 148. Surface formations 138 and 148 may include one or more indentations that correspond to a volume of cavity 102 as measured from a bottom of cavity 102 to surface formation 138.

In an embodiment, surface formation 138 may represent a volume measured in a desired unit, such as ounces, milliliters, or the likes. A user may add ingredients to the blending container 20 and blending container 20 may easily convey when the ingredients reach a volume represented by the surface formation 138. In another example, surface formation 148 may represent a maximum suggested fill indicia for blending system 10. For instance, ingredients may be added to blending container 20 until the ingredients are about level with the indicia of surface formation 148. Filling beyond the indicia may result in decreased blending ability of blending container 20.

It is noted that surface formations 138 and 148 may include marks or protrusions formed via an injection molding process or other process, such as an etching process, which may include chemical etching, laser etching, mechanical etching or the likes. In at least one embodiment, surface formations may be disposed on or at an inner surface of carrier 30, such as a surface adjacent to liner 40 (e.g., proximal to cavity 47 as described with reference to FIG. 6). It is further noted that surface formation may include a paint or other pigmented material that may increase visibility and/or provide for indicia. It is further noted that surface formations may be disposed or formed within a material (e.g., plastic) of carrier 30.

In another aspect, formation of surface formations 138 or 148 via a plastic material may allow for reduced cost and reduced difficulty in manufacturing in comparison to glass containers. For instance, the surface formations 138 or 148 may be monolithically formed with the carrier 30, such as through an injection molding process or any other suitable process.

In an embodiment, blending container 20 may include markings or indicia located between carrier 30 and liner 40. For example, with reference to FIG. 6, blending container 20 may include markings or indicia located proximal to cavity 47. The markings may be disposed on a surface of carrier 30 or liner 40 that is generally adjacent to cavity 47. It is noted that other components may be disposed in cavity 47, such as plastic, paper, or the likes. In an aspect, one or more paper or plastic inserts may be disposed within the cavity 47, such that the insert may indicate a level of ingredients or the likes.

Disposing markings or indicia, whether as an insert, paint, surface formation, or the likes, adjacent to cavity 47 may prevent or reduce wear on the markings, indicia, and/or surface formations. In an example, paint deposited on a surface of carrier 30 or liner 40 adjacent to cavity 47 may be protected from wearing or degrading due to washing, abrasive materials, foodstuffs, use, or the likes.

As noted above, FIG. 6 is a partial cross-sectional view of blending system 10 with an expanded view of an interlocking region 200. As described herein, liner 40 may be at least partially disposed within carrier 30. In an aspect, carrier 30 may generally circumscribe the liner 40.

In an embodiment, carrier 30 may include lip 132. Lip 132 may be monolithically formed with the carrier 30, which may result in the lip 132 being of substantially the same material as the carrier 30 (e.g., plastic). In another aspect, liner 40 may include a lip 32 formed at a top opening 44 of the liner 40. The lip 32 may be monolithically formed with the liner 40, which may result in the lip 32 being of substantially the same material as the liner 40 (e.g., glass). In an aspect, lips 32 and/or 132 may be formed from suitable materials to withstand temperature changes, cold temperatures, hot temperatures, vacuum pressure, or the likes.

It is noted that references to top, bottom, or the likes refer to a position relative to an orientation of the figures. For instance, top opening 44 is described as "top" for simplicity of explanation and sake of brevity. Thus, in some embodiments, top opening 44 may be a bottom opening, such as in single serving container applications, spice grinder applications, or the likes. While a lip is described, it is noted that lip 132 and lip 32 may include a flange, a flat or rounded edge, threaded members, channels, or the likes. For example, blending container 20 may include a single serving container comprising a body that may be engaged with a blade assembly. The blade assembly may attach to the container through a desired method of attachment, such as via threaded members (e.g., a screw-on blade assembly).

As depicted, lip 32 may engage with lip 132 to enclose a cavity 47 between the liner 40 and carrier 30. In at least one embodiment, one or more materials may be deposited between lip 32 and lip 132, and/or between liner 40 and carrier 30. For instance, an adhesive may be deposited between lip 32 and lip 132.

This cavity 47 may be a thermal cavity or barrier that may restrict the transfer of thermal energy. For instance, cavity 47 may create a barrier (e.g., air barrier) that may insulate foodstuffs in cavity 102, which may substantially maintain foodstuffs at desired temperatures (e.g., cold, hot, warm, etc.). In an aspect, cavity 47 may be sealed from an ambient atmosphere, such as via an airtight or watertight seal. In at least one embodiment, cavity 47 may comprise a material disposed within at least a portion of cavity 47. For instance, cavity 47 may include a foam, which may insolate liner 40. In another example, cavity 47 may include a liquid, solid or gas disposed therein. In at least one embodiment, cavity 47 may include a gas such as an inherit gas (e.g., helium, etc.), or the like, which may be selected for desired thermal properties.

In embodiments, blending container 20 may include an over-mold seal 33. Over-mold seal 33 may operatively attach to at least one of carrier 30 or liner 40. In an aspect, over-mold seal 33 may be comprised by at least one of carrier 30 or liner 40. For instance, carrier 30 may include the over-mold seal 33 operatively attached thereto. Over-mold seal 33 may generally surround a circumferential end portion 31 and/or lip 132 of the carrier 30, as described with reference to FIG. 8. However, it is noted that over-mold seal 33 may be located at any appropriate position.

By way of non-limiting examples, lip 32 may be monolithically formed with over-mold seal 33 and/or over-mold seal 33 may be attached (e.g., removably or irremovably) to lip 32. Over-mold seal may attach to lip 132 to sealingly engage carrier 30. For instance, the over-mold seal 33 may extend from the inner circumference of top opening 44 of liner 40 to the outer circumference of top opening 34 of carrier 30, extend from the outer circumference of top opening 44 of liner 40 to the outer circumference of top opening 34 of carrier 30, and any other suitable combination thereof. In other embodiments, the over-mold seal 33 may be monolithically formed with lip 132 or may be attached (e.g., removably or irremovably) to lip 132. It is noted that over-mold seal 33 may wrap around lip 132 and/or may surround or encompass lip 132.

In an embodiment, over-mold seal 33 may be of separate construction and may attach to the carrier 30 and/or liner 40. In an aspect, the over-mold seal 33 may be fixedly connected to the carrier 30 and/or liner 40. In other embodiments, over-mold seal 33 may be chemically bonded to the carrier 30 and/or liner 40. Further, at least one part of over-mold seal 33 may be removably connected to the carrier 30 and/or liner 40.

While over-mold seal 33 is described as an over-molded member, it is noted that various other configurations may be utilized. In an embodiment, over-mold seal 33 may include a ring or frame-shaped member that may attach to lip 32 and 132. The ring may latch to lip 32 and 132 to create a seal. In another aspect, lip 32 and lip 132 may include locking mechanisms, such as channel locks, threaded members, or the likes. Such locking mechanisms may allow for selective coupling of carrier 30 and liner 40. It is noted that over-mold seal 33 may include and/or be covered with a chemical sealant, non-stick coating, or the likes.

The blending container 20 may include features to alter the flow of foodstuff within the blending container 20. For instance, liner 40 may include flutes 104, flats 106, and/or rounded corners 108. Such features may impede or interrupt flow of foodstuffs during blending to force foodstuffs towards a blade assembly. For example, liner 40 may include flutes 140 that may include protrusion extending towards cavity 102. The flutes 140 may be any appropriate shape, such as generally rounded, triangular, or the likes. In another aspect, flats 106 may include sloped portions and form a ledge. It is noted that blending container 20 may include various numbers of flutes 104, flats 106, and/or rounded corners 108. It is further noted that such members may include different shapes, dimensions, and configurations according to a desired implementation.

In an embodiment, the lip 32 may be coupled with lid 70, as described in more detail below, and/or blender attachments. Lip 32 may be any appropriate size and shape, such as rounded, beveled, or curved. It may be desirable to have a lip shape that allows for a strong fit between each part in contact with the lip 32, as well as a lip shape that allows for controlled pouring of liquids without excessive spillage.

In another aspect, carrier 30 and liner 40 may be generally removed and/or not in contact with one another, except for at or near lips 32 and 132. For instance, cavity 47 may be generally disposed throughout blending container 20. The cavity may separate the carrier 30 from the liner 40. It is noted that the distance between carrier 30 and liner 40 may or may not be consistent throughout cavity 47. For example, a measured distance between a sidewall of carrier 30 and a side wall of liner 40 may be a first distance, and a measured distance between a bottom of carrier 30 and a bottom of liner 40 may be a second distance.

In at least one embodiment, blending container 20 may include one or more supports that may provide points of contact between carrier 30 and liner 40. For instance, coupling component 45 and/or bottom coupling component 35 may be in contact with carrier 30 and liner 40. In another aspect, a protrusion or support arm may extend between carrier 30 and liner 40. The protrusion may be formed monolithically with carrier 30 or liner 40. In an example, a support may include a material having poor thermal transfer properties (e.g., thermally insulated materials, etc.). It is further noted that all or a portion of cavity 47 may include a support material (e.g., foam, plastic, etc.).

Figure 7:
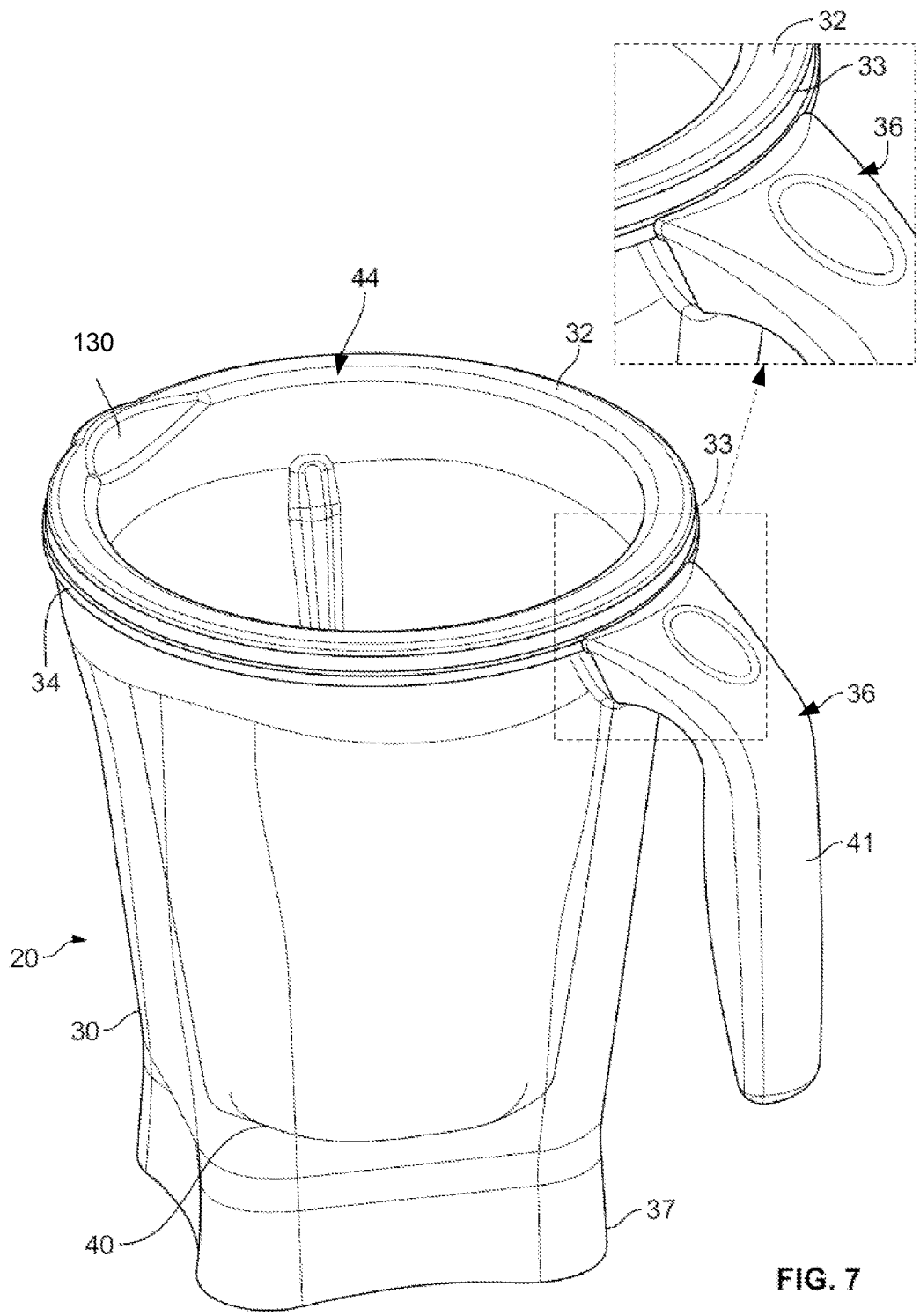
FIG. 7 is a front and left perspective side view of a blending container with a lid removed, in accordance with various disclosed aspects.
Figure 8:
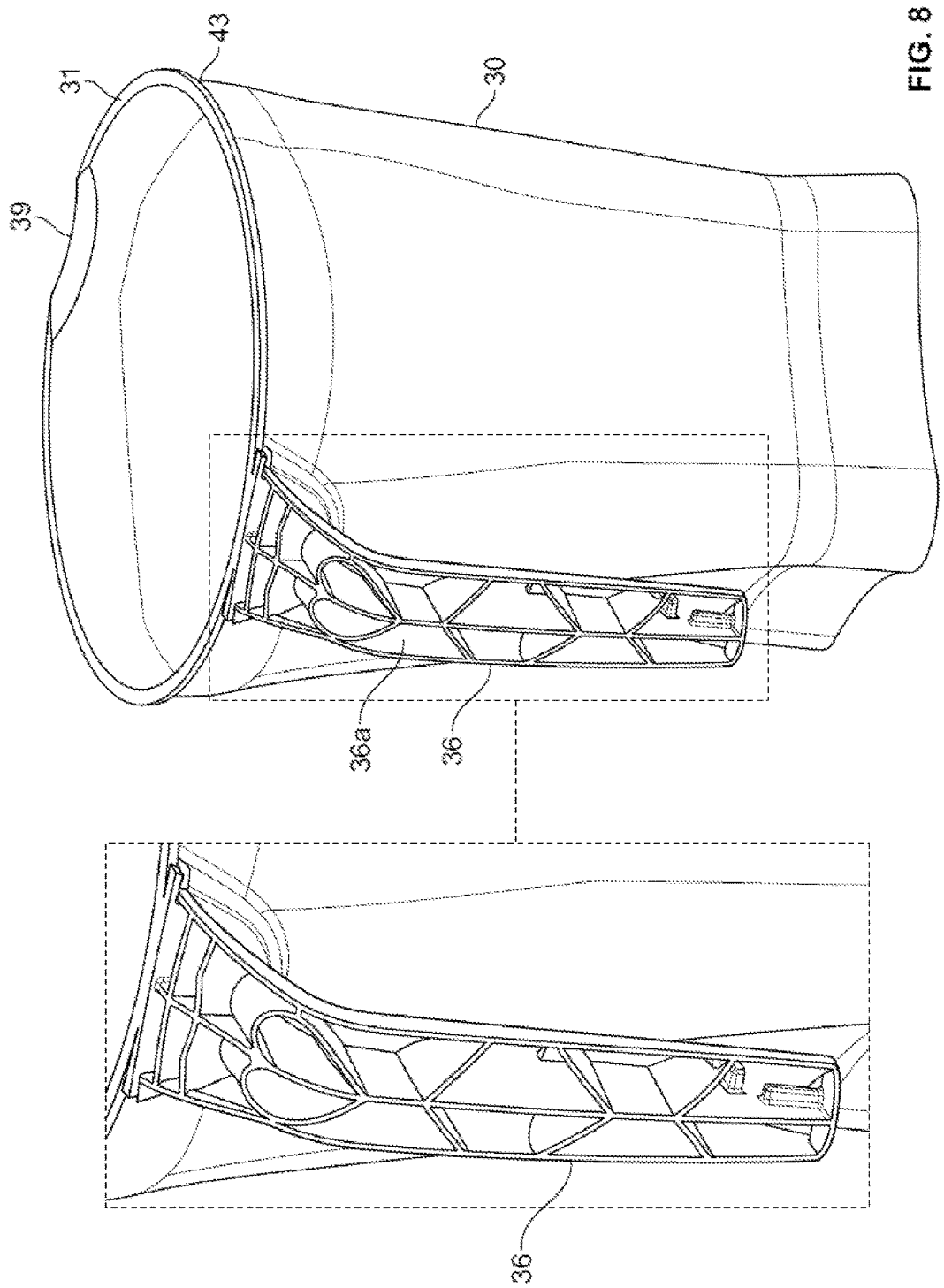
FIG. 8 is a front and right perspective view of a portion of the carrier, in accordance with various disclosed aspects.
Figure 9A:
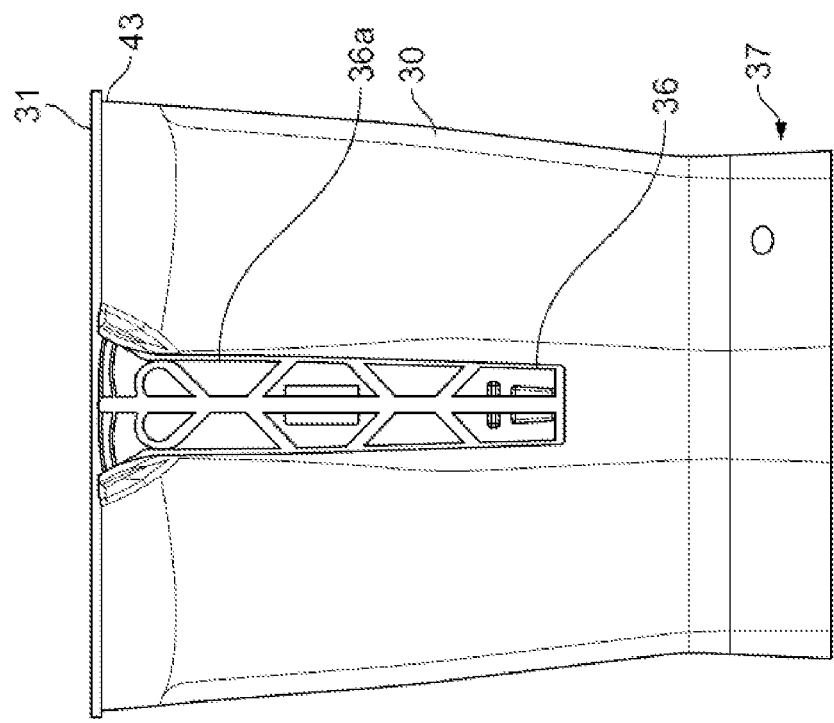
FIG. 9a is a front view of a portion of the carrier, in accordance with various disclosed aspects.
Figure 9B:
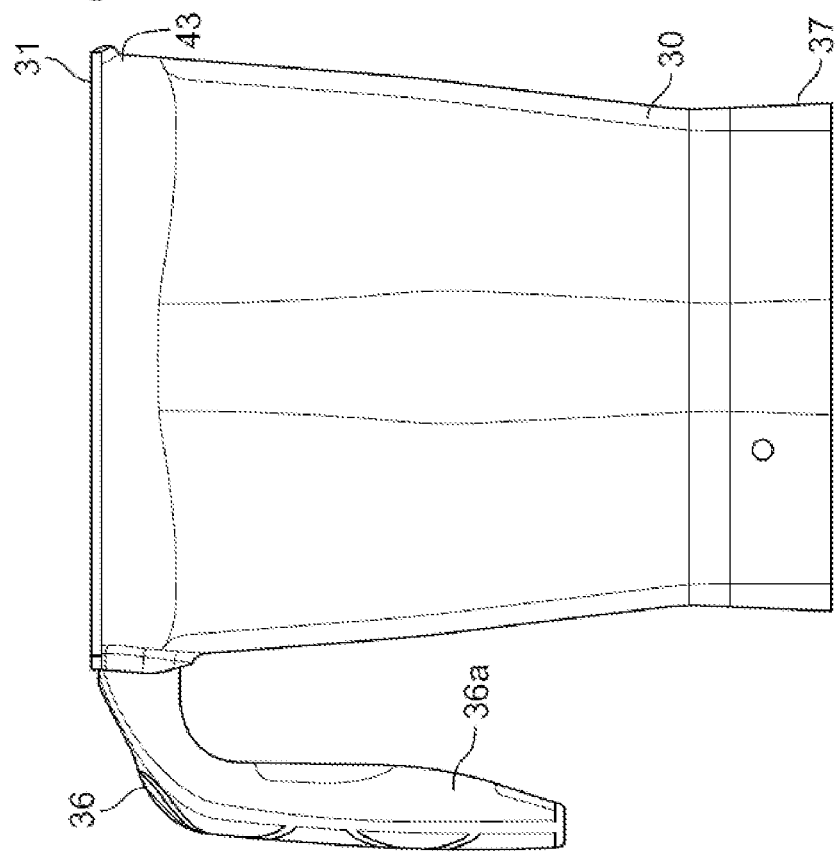
FIG. 9b is a right side view of the carrier, in accordance with various disclosed aspects.

Various aspects will now be described with reference to FIGS. 7, 8, and 9A-B. In which, FIG. 7 is a front and left perspective view of the blending system 10 with lid 70 removed; FIG. 8 is a front and right perspective view of a portion of the carrier 30; FIG. 9a is a front view of a portion of the carrier 30; and FIG. 9b is a right side view of a portion of the carrier 30.

In an aspect, lip 32 and top opening 44 may include at least one spout 130. Spout 130 may include an indentation or protrusion that forms a generally concave shape. The concave shape may direct flow of foodstuffs from pouring foodstuffs form container 20. In another aspect, carrier 30 may include an upper portion 43 having an open end with a circumferential end portion 31. The circumferential end portion 31 may include a carrier spout portion 39 that forms a portion of spout 130 such that when the liner 40 is operatively attached with the carrier 30, the carrier spout portion 39 forms a portion of the spout 130. The spout 130 may allow for controlled pouring of foodstuffs without excessive spillage.

As noted above, carrier 30 may include at least one handle of any appropriate shape and type, such as handle 36. As described above, handle 36 may be a low profile handle made of a suitable material, such as metal, glass, plastic, wood, and the likes. In an example, handle 36 may comprise a material including, without limitation, a portion of which may be formed of thermoplastic polyurethane (TPU) and the remaining portion may be formed from a plastic such as a polymer material, polycarbonate, BPA (bisphenol-a) free plastic, food grade plastics, copolyester (e.g., TRITAN), and the likes.

In at least one embodiment, at least a portion of handle 36 may be monolithically formed with the carrier 30, such as body portion 36a. Body portion 36a may be monolithically formed with carrier 30, such that body portion 36a and carrier 30 are formed of a common material. In an aspect, body portion 36a and carrier 30 may be comprised of a material that has a lower weight than a material of liner 40. For example, body portion 36a and carrier 30 may comprise a plastic material and the liner 40 may comprise a glass material. The plastic material of body portion 36a and carrier 30 may result in reduced weight of the blending container 20 in comparison with glass handle and/or an all glass container.

In another aspect, body portion 36a may be over-molded with grip 41. The grip 41 may be removably or irremovably attached to the body portion 36a. The grip 41 may comprise various materials, such as, but not limited to, plastics, metals, woods, and the likes. In at least one example, the grip 41 may include a TPU material. In various embodiments, grip 41 may be a soft material that contributes to the ergonomic benefit of the handle 36. The shape of the plastic handle 36a and grip 41 may provide an ergonomically efficient shape that may increase user satisfaction. For instance, handle 36 may include rounded portions, curved portions, concave portions for receiving a user's finger, or the likes.

It is noted that various other configurations are within the scope and spirit of this disclosure. For instance, grip 41 and body portion 36a may be monolithically formed, formed of different or common materials, and the likes. In other example, grip 41 may be monolithically formed with or attached to (e.g., removably and/or irremovably) another component of the blending system 10, such as over-mold seal 33.

At least one part of handle 36 may mate at the same surface level as lip 32 described herein. In another embodiment, handle 36 may be at a different level than the level of the lip 32. Handle 36 may be formed with a generally geometric shape, have ergonomic benefits, contain a grip portion, or contain any combination thereof. It is noted that blending container 20 may include a different number of handles, no handles, and/or differently configured handles.

Figure 10:
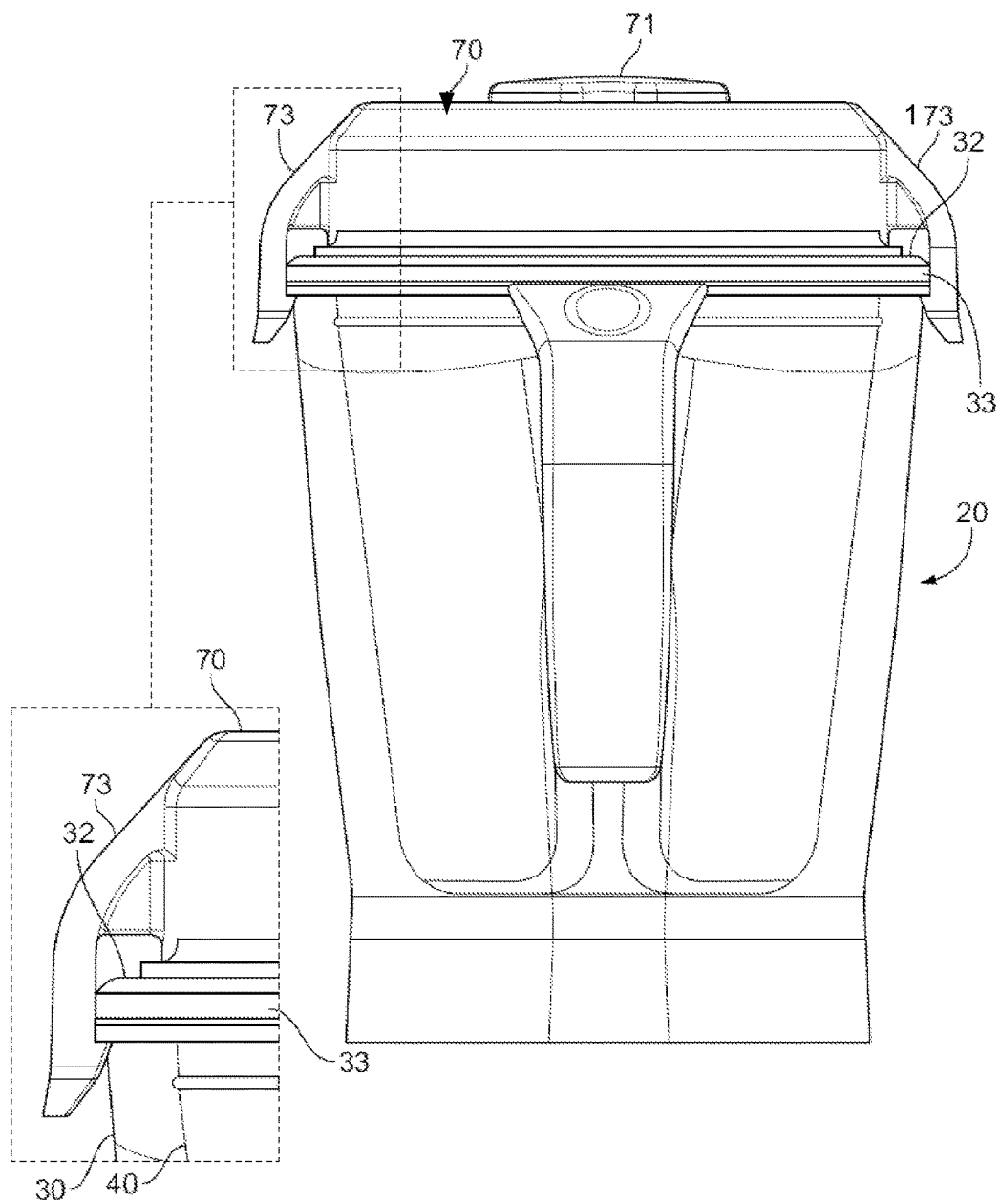
FIG. 10 is a back side view of a blending container with a carrier, in accordance with various disclosed aspects.
Figure 11:
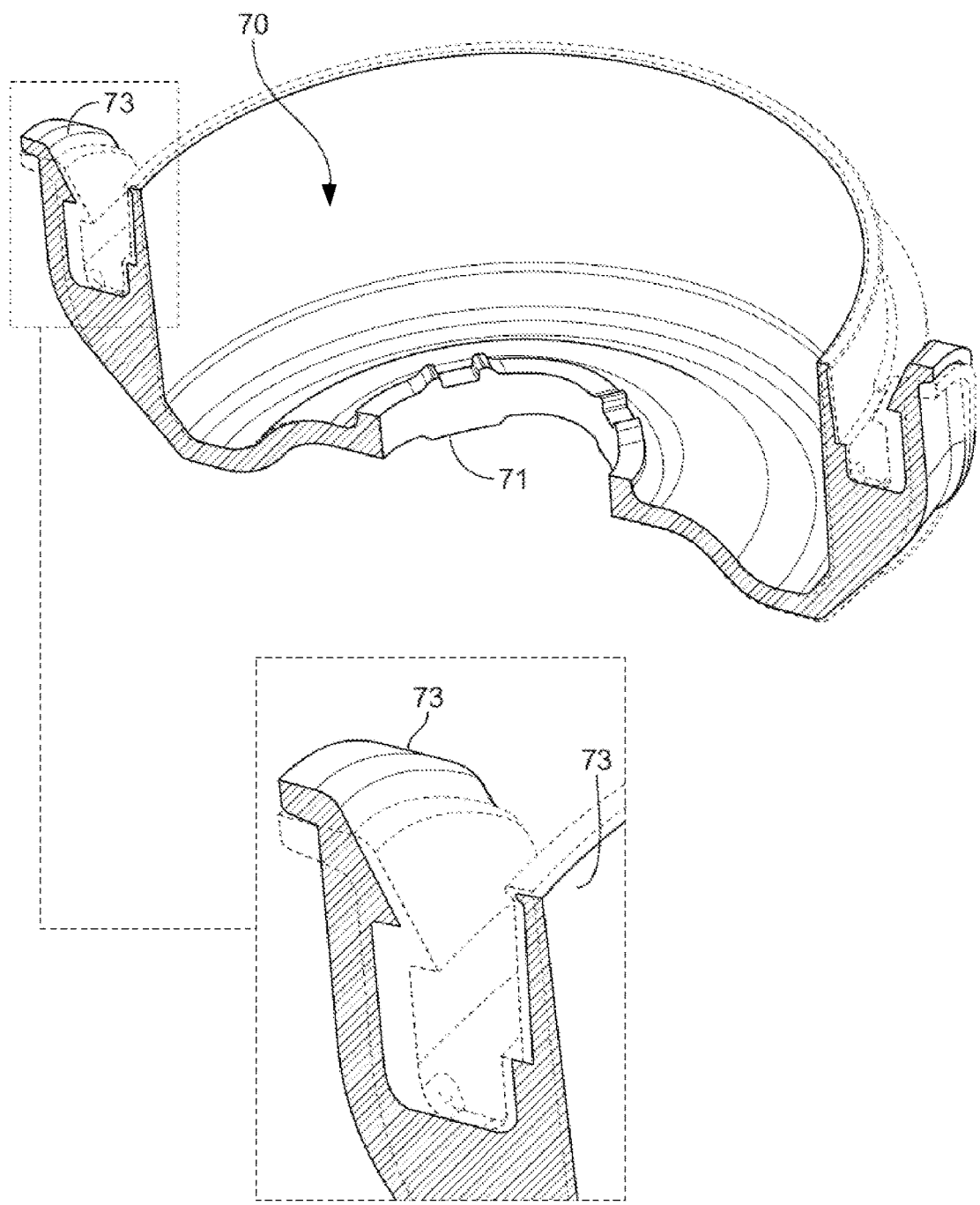
FIG. 11 is a cross-sectional view of a lid of a blending container and a detailed view of the lid.

Turning now to FIGS. 10 and 11, illustrated are a front view of blending system 10, with an enlarged view of latching device 73, and a partial cross-sectional view of lid 70 with an enlarged view of latching device 73. As described, blending system 10 may include a lid 70 selectively attachable thereto. Lid 70 may optionally include opening 71 formed in the lid 70 and a cap 171. Cap 171 may be selectively attachable to lid 70. For example, cap 171 may be attached to lid 70 to contribute to enclosing foodstuffs or the likes. In another aspect, cap 171 may be removed or detached from lid 70 to provide access to cavity 102. A user may then pour foodstuff into a blender while the lid is attached or may utilize a tamper during operation of the blending system 10.

Lid 70 may include a sealing mechanism 72 that may create a seal when the lid 70 is placed on the blending container 20. In an aspect, the sealing mechanism 72 may include a material that may be deformed when pressure or force is applied thereto. For example, a sealing mechanism may include a rubber, foam, or the likes that may be deformed to match or mate with a surface, such as a surface of lip 32. It is noted that sealing mechanism 72 may include other components, such as a gasket.

In embodiments, lid 70 may include latching device 73. Latching device 73 may comprise a clasp, screw/bolt, latch, or other devices that may secure lid 70 to blending container 20. It is noted that latching device 73 may be monolithically formed with lid 70, blending container 20, handle 36, or the likes. In other embodiments, latching device 73 may comprise a separate component that may attach to one or more members of blending system 10. It is noted that latching device 73 may include one or more portions that may be disparately formed. For instance, latching device 73 may include a lid portion that is monolithically formed with lid 70 and a container portion that may be monolithically formed with the blending container 20. In an example, the lid portion may be received by the container portion and vice versa (e.g., such as a male and female threaded member, a latch and clasp, a channel lock system, etc.).

As depicted, latching device 73 may include at least one U-shaped latch that creates a generally flushed seal with the blending container 20, and connects along an exterior side of the top opening 34 of the carrier 30. While FIGS. 10 and 11 depict lid 70 comprising a pair of latching devices, it is noted that lid 70 may include a different number of latching devices. In another aspect, lid 70 may include different types of latching devices, such as a screw top and a latch. In another aspect, latching devices may be disposed along any portion of lid 70 and/or blending container 20. While latching devices are depicted as generally opposite each other in FIGS. 10 and 11, it is noted that latching device 73 may be disposed at any appropriate position.

Further, as shown in FIG. 10, the latching device 73 may selectively engage with the seal 33, which may provide a seal that may be substantially air-tight, water-tight, or the likes. In another aspect, the seal may be less than substantially air-tight, water-tight, etc. For instance, the seal may be configured to reduce the possibility of the lid detaching during blending, reduce vibration, reduce temperature and/or pressure change, of the likes. In embodiments, as the seal 33 is engaged with the lip 32, the latching device 73 may allow for an increased diameter on the lip 32, which provides an improved seal with respect to smaller diameters.

As noted herein, latching device 73 may be monolithically formed with lid 70 or may be attached through a subsequent operation. The latching device 73 may be positioned on the lid 70 in a fixed position to allow for the bottom of latching device 73 to operatively engage an underside of the over-mold seal 33. The latching device 73 may be a substantially hook-shaped latch to selectively attach the lid 70 with the blending container 20. The latching device 73 may prevent the lid 70 from separating from the blending container 20 during operation of the blending system 10.

In operation, the blending container 20 may be lighter than traditional glass containers. Further, the carrier 30 being plastic may generally help contain the glass liner 40, especially if the glass liner 40 were to break. The carrier 30 also provides a protective layer that reduces the likelihood of the liner 40 breaking during normal operation or otherwise. The carrier 30 being plastic reduces the overall weight of the container 20 while allowing a glass mixing container, i.e., the liner 40. Further still, the plastic carrier 30 allows the handle 36 and pedestal 37 to be plastic as opposed to glass.

Blending system 10 may include a drive assembly (not shown). The drive assembly may drive blades or other blending instruments in the liner 40. The drive assembly may include a shaft, or other similar drive mechanisms, that extend through the bottom coupling element 35 of the carrier 30 and the bottom coupling element 45 of the liner 40. The drive assembly may include any combination of appropriate gearings and bushings, a die-cut washer seal, and other drive devices to engage a motor and transfer rotation of the motor to blades or other mixing means. The components of the drive assembly may include any appropriate material, such as metal, ceramics, plastics, glass, metal/resin hybrids, and any combination thereof.

Drive assembly may include blades, or other mixing attachments, formed inside the liner 40. The blades may be any appropriate size and shape, such as sized and shaped to fit within the liner 40. The blades may be made of any appropriate material, such as appropriate metals, or other suitable materials, such as brushed metal, die-cast metal, stainless steel, polycarbonate, ceramics, glass, metal/resin hybrids.

The blades may be operatively coupled to a blender base and configured to rotate with respect to the base. Blender base may receive blending container 20. For example, the pedestal 37 of the blending container may operatively engage with the blender base. This engagement may permit the blades to rotate within the blending container 20 and to appropriately mix the foodstuff therein. A seal can be formed around the outside, inside, and/or align directly with the blender base.

The blades may include a housing. The housing may be generally cylindrical or any other appropriate shape. The housing may be operatively coupled with the blending container 20 in any appropriate manner. It is noted that, however, that the housing may be any appropriate shape.

The blades may include an electrical interlock in connection with the blender base, to prevent access to the blades. For example, the blending container 20 may include a tab. The tab may include a magnet embedded therein for optional connection to a blender base. A blender base may be exposed to a reed switch or similar sensor to detect the present of the magnet. The blender base may be configured to allow function of the motor when the reed switch senses the magnet at the appropriate position, and to disable the motor when the magnet is not at the appropriate position. The electrical interlock may be designed to prevent circumvention. For example, the reed switch may be calibrated to disengage the motor anytime the magnet is far enough away to create an opening large enough to access the blades. Examples of these features are shown and described in U.S. patent application Ser. No. 14/195,159, entitled "Blending System," which is hereby incorporated by reference.

Blending system 10 may include a motor and a control panel that are formed in the blender base. Blending system 10 may contain various components such as gearing, a fan, vents, and other components to facilitate rotational movement of motor as required for blending. The control panel may include at least one knob or button to selectively adjust settings, such as speed settings, of the blending system 10. It will be appreciated that the control panel may further include other input devices, such as buttons and switches, and other feedback and readout devices, such as an LCD or LED display.

Although the present embodiments have been illustrated in the accompanying drawings and described in the foregoing detailed description, it is to be understood that the blending system is not to be limited to just the embodiments disclosed, but that the blending system described herein is capable of numerous rearrangements, modifications and substitutions.

What is claimed is:

1. A container of a blending system configured to engage a base of the blending system, the container comprising:
   a carrier formed from a first material and comprising side walls and a bottom; and
   a liner positioned in the carrier a distance apart from the carrier, wherein the carrier generally circumscribes the liner, the liner comprising side walls and a bottom;
   wherein the liner is formed from a second material different from the first material,
   wherein the side walls of the carrier are generally adjacent to the side walls of the liner, and the bottom of the carrier is generally adjacent to the bottom of the liner
   wherein the first material is plastic;
   wherein the second material is glass
   an aperture formed through the carrier and the liner and operatively receiving at least a portion of one of a blade assembly or a drive shaft of a motor.

2. The container of claim 1, wherein the plastic is a polymer plastic.

3. The container of claim 1, wherein the liner includes a lip formed at a top opening of the liner.

4. The container of claim 3, wherein the lip engages a portion of the carrier.

5. The container of claim 3, wherein the carrier includes an over-mold seal that surrounds a periphery of the carrier and sealingly engages the lip of the liner.

6. The container of claim 5, wherein the over-mold seal is chemically bonded to the carrier.

7. The container of claim 1, further comprising a handle attached with the carrier.

8. The container of claim 7, wherein the handle is monolithically formed with the carrier.

9. The container of claim 8, wherein the handle is formed from the first material and the first material comprises plastic.

10. The container of claim 1, wherein the carrier includes a pedestal formed from the first material.

11. The container of claim 1, further comprising a cavity separating at least a portion of the carrier from at least a portion of the liner.

12. The container of claim 1, wherein the carrier includes at least one surface formation.

13. The container of claim 12, wherein the at least one surface formation is at least one indicia formed of the first material.

14. A blending system comprising a container configured to selectively engage a base of the blending system, the container comprising:
- a carrier formed of a plastic;
- a handle extending from the carrier and formed from the plastic, the handle including a gripping portion attached thereto, wherein the gripping portion is formed from an elastomeric material;
- a liner positioned in the carrier, the liner formed from glass, wherein the carrier generally circumscribes the liner,
- a cavity disposed between the liner and the carrier, and
- a seal connected to the carrier, the seal sealingly engaged with the liner.

15. The container of claim 14, wherein the seal is monolithically formed with the gripping portion of the handle.

16. The container of claim 14, wherein the seal is formed from the elastomeric material of the grip.

17. The container of claim 14, wherein the engagement of the seal and liner forms a thermal cavity between the liner and carrier.

18. The container of claim 14, wherein the liner includes a lip and the seal sealingly engages the lip.

19. The container of claim 18, further comprising a lid having at least one latching device, wherein the latching device selectively engages the seal and lip and operatively secures the lid with either of the liner and carrier.

20. A container configured to selectively engage a base of a blending system, the container comprising:
- a carrier formed of plastic;
- a liner positioned in the carrier forming a cavity between the liner and the carrier, the liner formed from glass, wherein the carrier generally circumscribes the liner;
- an aperture formed through the carrier and the liner and operatively receiving at least a portion of one of a blade assembly or a drive shaft of a motor; and
- a pedestal monolithically formed with the carrier and formed from the plastic, the pedestal configured to operatively engage the base.

21. The container of claim 20, further comprising a handle extending from the carrier and formed from the plastic, the handle including a gripping portion attached thereto, wherein the gripping portion is formed from a rubber.

22. The container of claim 21, wherein the liner includes a lip extending from an open portion.

23. The container of claim 22, further comprising an over-mold seal attached with the carrier, the over-mold seal sealingly engaged with the lip.

24. The container of claim 23, wherein the seal, liner and container form a thermal cavity.

* * * * *